United States Patent [19]

Allen, Jr.

[11] Patent Number: 4,773,308
[45] Date of Patent: Sep. 27, 1988

[54] VENTILATION DEVICE FOR AUTOMOBILES

[76] Inventor: William G. Allen, Jr., Apartado Postal 410, Ajijic, Jalisco, Mexico

[21] Appl. No.: 159,130

[22] Filed: Feb. 23, 1988

[51] Int. Cl.$^4$ .............................................. B60H 1/26
[52] U.S. Cl. ................................................... 98/2.13
[58] Field of Search ...................... 98/2.12, 2.13, 2.18, 98/93; 296/84 A, 91, 152

[56] References Cited

U.S. PATENT DOCUMENTS

| | | | |
|---|---|---|---|
| 1,588,654 | 6/1926 | Brownlee | 98/2.13 |
| 1,718,083 | 6/1929 | Segelken | 98/2.13 |
| 1,750,789 | 3/1930 | Thompson | 98/2.13 |
| 1,847,861 | 3/1932 | Bradbury | 98/2.13 |
| 1,978,399 | 10/1934 | Blakeslee | 98/2 |
| 2,680,646 | 6/1954 | Bush | 98/2.13 X |
| 2,859,680 | 11/1958 | O'Shei | 98/2 |
| 3,730,070 | 5/1973 | Pedersen | 98/2.13 X |
| 4,111,106 | 9/1978 | Burns | 98/2.13 |
| 4,527,466 | 7/1985 | Kossor et al. | 98/2.13 |

FOREIGN PATENT DOCUMENTS

| | | | |
|---|---|---|---|
| 1903012 | 8/1970 | Fed. Rep. of Germany | 98/2.12 |
| 1903013 | 8/1970 | Fed. Rep. of Germany | 98/2.12 |
| 2227047 | 7/1973 | Fed. Rep. of Germany | 98/2.12 |

*Primary Examiner*—Harold Joyce
*Attorney, Agent, or Firm*—Kimmel, Crowell & Weaver

[57] ABSTRACT

A one-piece flattened tubular member is formed into the shape of a U. The formed bottom of the U can be mounted over an automobile glass window and then the window is closed so as to retain the device mounted on an automobile. The ends of the flattened tubular member are slanted or tapered transversely to the width of the tubular member so that when the device is mounted in one direction on an automobile window, forward motion of the automobile will effect a vacuum along the outer edge of the tubular member and thus suck air from inside the automobile. When the device is mounted in the opposite direction on an automobile window, pressure created by movement of the vehicle along the outer edge of the tubular member creates air pressure within the automobile.

11 Claims, 1 Drawing Sheet

VENTILATION DEVICE FOR AUTOMOBILES

BACKGROUND OF THE INVENTION

1. Field of the Invention

This invention relates generally to devices for providing ventilation for automobiles.

2. Description of the Prior Art

A common problem with known ventilation devices for attachment to an automobile or similar motorized vehicle is that in many instances the installation of same is very complicated. Furthermore, such devices cannot easily and quickly be changed from one window to another, especially when the vehicle is in motion.

Another problem with known devices is that they are designed for either exhausting air from the vehicle, or pressurizing the air within the vehicle, but are not quickly and easily adaptable to effect either condition.

Furthermore, known type devices, being fairly complicated, are also relatively expensive to manufacture, install and maintain.

Existing prior patents which may be pertinent to the present invention are as follows:

1,588,654—6/15/26—Brownlee
1,718,083—6/18/29—Segelken
1,750,789—3/18/30—Thompson
1,978,399—10/30/34—Blakeslee
2,859,680—11/11/58—O'Shei
4,111,106—9/5/78—Burns
4,527,466—7/9/85—Kossor et al.

U.S. Pat. No. 1,588,654 to Brownlee is in the form of a clip arrangement adapted to fit over the upper section of a window; however, it is formed of metal, and is not easily manufactured, installed or maintained. It also is not designed for pressurizing the air within a vehicle. The Thompson patent shows a somewhat similar device for creating a suction within a motor vehicle. Again, this device is relatively complicated.

The other patents are adapted for fitting over an automobile window, but do not provide for the reversible air suction/pressure feature of the present invention, nor the easily manufactured and maintained features thereof.

None of the known prior art devices offer the new and novel features of the present invention.

SUMMARY OF THE INVENTION

An object of the present invention is to provide an easily manufactured, installed and maintained ventilation device for automobiles.

Another object of the present invention is to provide an easily installed ventilation device which can be reversed so that either a suction effect will occur in the automobile, or the air within the automobile will be pressurized.

A further object of this invention is to provide a ventilation device formed of a one-piece tubular element which has been flattened and formed into a U-shape, with the flattened legs of the U-shaped member adapted for positioning on the outside and inside, respectively, of an automobile window.

A still further object of the present invention is to provide a ventilation device for automobiles having a tubular conduit between tapered ends so that when mounted with an automobile in one direction, movement of the vehicle will effect a suction within same, and when mounted on the automobile window in the opposite direction, it will create a pressurization of the air within the vehicle.

The present invention has a number of new and novel features. Among them is the one-piece construction of transparent plastic tubular material in flattened form. This permits the device to be easily manufactured, installed and maintained. Also, it permits easy reversibility of the device on an automobile window, even when the vehicle is moving. Also, there are no parts to be attached or removed or lost.

The plastic material of which the device is made may be transparent or opaque, and also may be provided with advertising indicia or other appropriate messages thereon. Being easy to manufacture and relatively inexpensive, such a device may be used as an advertising give-away for automotive parts and supply stores, auto equipment supply houses, and similar commercial establishments. The extreme ends of the flattened tubular element are slanted transversely across the width of the element, with both of the respective ends being of similar inclination. Thus, when the device is installed on an auto window in one direction, a vacuum effect is created across the slanted edge of the outside portion of the member, which in turn effects a suction or vacuum effect along the opening of the inner portion of the tubular member. Similarly, when the device is reversed in its position on an automobile window pane, pressure created by the automobile travelling in a forward direction will create internal pressure from the tapered internal edge of the device.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
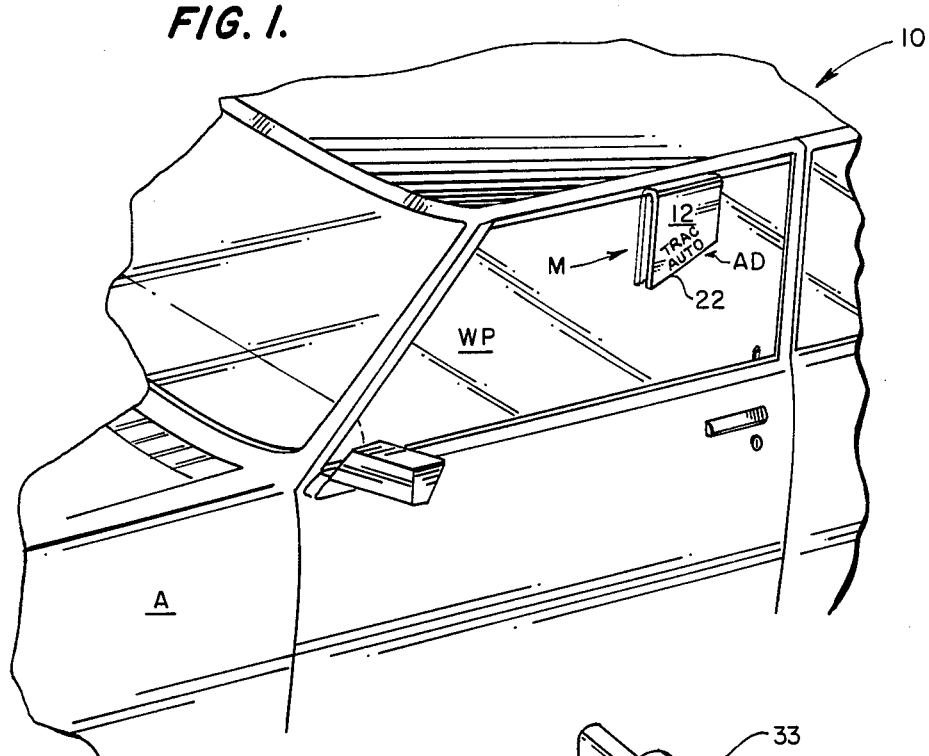
FIG. 1 is a perspective view of the device of the present invention as in use on an automobile window.

Referring to FIG. 1 of the drawing, reference numeral 10 indicates in general the device of the present invention. This device is formed of a flattened tubular member M which has been shaped and formed into the shape of an inverted U. As shown, outer sides 12 and 14 are created, connected by the closed end of the U-portion 33. Inner sides 13 and 15 are connected by U-portion 23. The sides 12, 13 and 14, 15 are connected at their leading and trailing edges since the tubular member is initially a one-piece tube. The respective sides 12, 13 and 14, 15 are provided with slanted ends 22 and 24. These ends are tapered and slanted with respect to the longitudinal axis of the tubular member.

Thus, when the device is mounted in one direction on an automobile window pane, suction created along the end 22 of the outside panel portion 12, 13 will effect a suction along the slanted end 24 of the input panel portion 14, 15. Likewise, when the overall device is reversed in position on a window glass of an automobile, the tapered slanted end 24, which will then be oblique to the direction of forward movement of the vehicle, will have a pressure input thereto which in turn will provide pressure air output from the edge 22 of panel 12, 13, which is now inside of the vehicle. Thus, merely by reversing this device, even while moving, pressurization of the automobile can be effected.

The present invention is extremely simple and made of only one piece. Preferably, the material from which the device is formed is of plastic. Plastic offers long life, easy formability and shaping characteristics, and can be either transparent or opaque. Of course, if desired, an advertising message AD or description may be provided on one or the other of the panels 12 or 14 of the device. With such message inscribed, or printed, or stencilled on the device, the device, which is relatively inexpensive, can be used as a give-away for commercial businesses to attract customers and/or advertise their firm.

Figure 2:
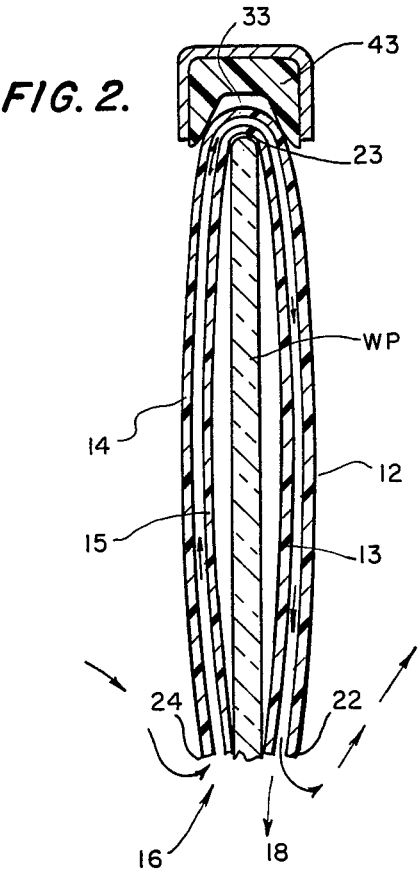
FIG. 2 is a cross-sectional view taken generally at the mid-section of the device shown in FIG. 1.
Figure 3:
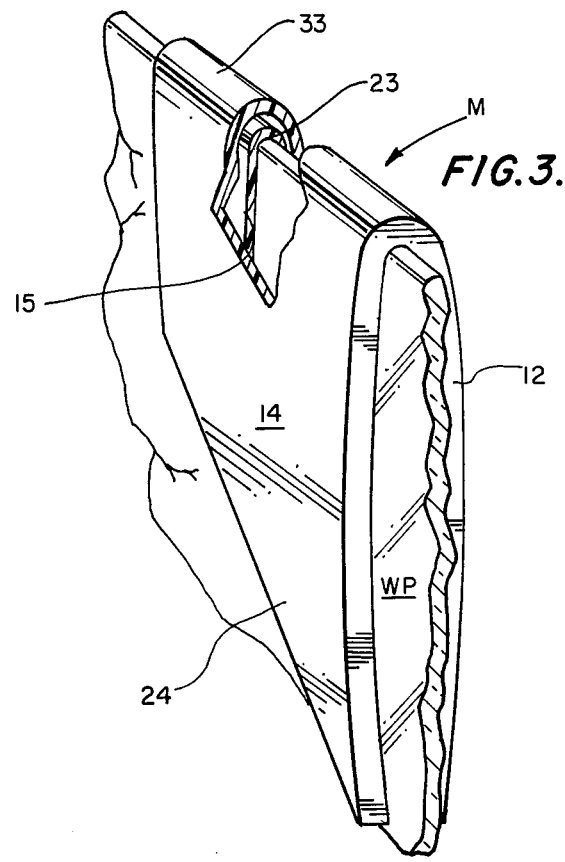
FIG. 3 is another perspective, partly broken away, of the device on the automobile window.

In the cross-sectional view of FIG. 2, the input flow 16, as well as the output flow 18, for the respective panels as mounted in FIG. 1 can be clearly seen. Preferably, the inner ends on the inside sides 13, 15 of the respective panels are bent slightly inwardly as shown so that when mounted on a vehicle window pane they will be closely adjacent to, or even touching same. The closed U portion 23 of the device will rest upon the upper edge of the automobile window pane, and the outer portion 33 will engage with the rubber seal molding 43 of the automobile with which the device is installed.

Thus, once this device is mounted on an automobile window pane, and the window is closed, it is then ready for operation in either the suction/vacuum effecting direction, or by re-opening the window and reversing the direction of the device and re-closing the window, it is ready for operation in the pressurized direction. This device is easily and inexpensively manufactured, and easy to install and maintain. Also, its reversibility offers features not present in many of the prior art devices.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ventilation device for automobiles comprising:
   a tubular element;
   said tubular element being flattened and then formed into the shape of a U;
   each of the respective ends of said tubular element being tapered transversely to the width of said tubular element; and
   said U-shaped element providing means for attachment of the device to a window glass of an automobile.

2. The ventilation device of claim 1, wherein said tapered ends respectively have the same degree of taper as each other.

3. The ventilation device of claim 2, wherein said flattened tubular element is of one-piece construction.

4. The ventilation device of claim 3, wherein said tubular element is formed of plastic material.

5. The ventilation device of claim 4, wherein said plastic material is transparent.

6. The ventilation device of claim 5, wherein said plastic material is opaque.

7. The ventilation device of claim 6, wherein advertising indicia is inscribed on said plastic material.

8. The ventilation device of claim 7, wherein said tapered ends being mounted on an automobile glass in one direction will effect a suction of air from inside the automobile.

9. The ventilation device of claim 8, wherein said tapered ends when mounted in the opposite direction will provide pressure as created by the outside air flow as the automobile travels to effect a pressure within said automobile.

10. The ventilation device of claim 1, wherein said tapered ends being mounted on an automobile glass in one direction will effect a suction of air from inside the automobile.

11. The ventilation device of claim 10, wherein said tapered ends when mounted in the opposite direction will provide pressure as created by the outside air flow as the automobile travels to effect a pressure within said automobile.

* * * * *